April 15, 1969   D. A. FLORANCE   3,438,070
BEEHIVE ENCLOSURE AND METHOD OF ENCLOSING A BEEHIVE
Filed Sept. 9, 1966

Douglas A. Florance INVENTOR.

BY Clarence A. O'Brien
and Harvey B. Jacobson
Attorneys

April 15, 1969 D. A. FLORANCE 3,438,070
BEEHIVE ENCLOSURE AND METHOD OF ENCLOSING A BEEHIVE
Filed Sept. 9, 1966 Sheet 2 of 2

Douglas A. Florance
INVENTOR.

BY *Clarence A. O'Brien*
and *Harvey B. Jacobson*
Attorneys

United States Patent Office

3,438,070
Patented Apr. 15, 1969

3,438,070
BEEHIVE ENCLOSURE AND METHOD OF ENCLOSING A BEEHIVE
Douglas A. Florance, Vestal, N.Y. (Box 123 Southview Station, Binghamton, N.Y. 13903)
Filed Sept. 9, 1966, Ser. No. 578,389
Int. Cl. A01k 47/02, 51/00
U.S. Cl. 6—1               9 Claims

ABSTRACT OF THE DISCLOSURE

A method and article for enclosing a beehive in a casing to protect the hive from temperature drops. The case completely surrounding the hive and leaving an air gap therebetween will move the dewpoint of the hive outside of the hive and within the casing so that condensation therein will form on the walls of the casing and not on the interior walls of the hive.

---

The present invention generally appertains to improvements in beehive enclosures and a method of protectively enclosing a beehive.

The provision of enclosures for beehives in connection with the keeping of bees is well known but such enclosures do not solve the principal problems, attendant with proper protection of the bees during the winter or cold seasons. For example, conventional enclosures depend upon ventilation to remove the condensation which accumulates inside the hive. To be effective as a drying agent, air must be heated and relative humidity reduced. The more or less dormant bees do not accomplish this. Rather, they are going to consume the honey stores and actually produce additional water. The moisture problem worsens as time passes and the bees are confined and continue to consume watery honey stores. Further, when the temperature drops, the bees are clustered into a ball and are not near the entrance to the hive and they will not push air in or out which is necessary for proper ventilation even though the cluster produces heat from the inside to maintain a temperature above approximately 57° F.

Accordingly, an important object of the present invention is to provide a novel method of protectively enclosing a beehive and an enclosure for a beehive whereby an insulating air space is created around the beehive proper so as to dispose the dewpoint outside the hive proper whereby moisture is prevented from accumulating in the hive thereby preventing contamination of honey stores and high relative humidity both of which are factors in causing dysentery in bees.

Another important object of the present invention is to provide a novel enclosure for a beehive, which is extremely valuable in insulation function to allow the wintering of bees at lower temperatures while enabling the beekeeper to remove the top of the enclosure so as to permit the winter sunshine, such as during a brief respite from the severe cold weather, to come into direct contact with the beehive to warm the hive sufficiently to attract the bees to a "sanitary flight" or to permit a cluster to move to fresh stores.

Another important object of the present invention is to provide a beehive enclosure, which is constructed from easily assembled and disassembled parts, such parts being formed from materials and in such a way that they will not rot, mildew or deteriorate in storage and will not absorb moisture in use so that, consequently, they cannot freeze.

In the latter respect, an important feature of the present invention resides in the construction of the walls of the enclosure from expanded polyurethane or similar material having properties of thermal insulation and vapor barriers.

Another important object of the present invention is to provide a method of and an enclosure for protectively enclosing a beehive wherein the hive is mounted in spaced insulated relation with a supporting outdoor ground surface and is enclosed with the enclosure resting on the ground surface and spaced from the beehive to establish an air space between the beehive and the enclosure, whereby when condensation appears it will collect on the inside surface of the enclosure and drain to the ground with the beehive being mounted in spaced insulated relation on the ground so as to be protected from ground temperature and moisture, including the accumulated condensate on the ground.

Another important object of the present invention is to provide a simply and sturdily constructed and compactly and inexpensively fabricated beehive enclosure, which can be purchased in a dismantled condition and easily assembled for efficient and effective use and which can be easily disassembled for storage purposes.

These together with other objects and advantages which will become subsequently apparent reside in the details of construction and operation as more fully hereinafter described and claimed, reference being had to the accompanying drawings, forming a part hereof, wherein like numerals refer to like parts throughout, and in which:

Figure 2:
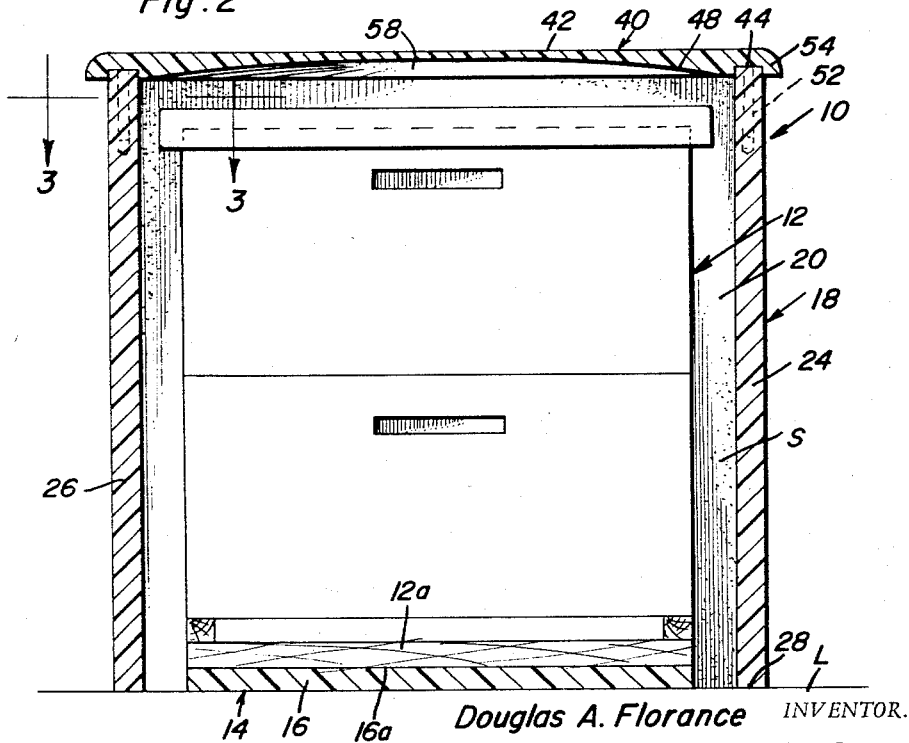
FIGURE 2 is a transverse, vertical sectional view, taken on line 2—2 of FIGURE 1, and showing the enclosure in its enclosing associated relationship with a conventional beehive.

Referring now more particularly to the accompanying drawings, the reference numeral 10 generally designates a beehive enclosure, constructed and utilized in conjunction with a conventional beehive 12, in accordance with the present invention and as shown primarily in FIGURE 2.

As aforestated, one of the principal problems in connection with the keeping of bees for the production of honey resides principally in the protection of the beehive during cold weather, as in the winter. Presently known beehive enclosures usually include tar paper, quilting or other material wrapped around the beehive to serve as insulating means therefor. However, such material will adsorb moisture and later freeze. Further, known enclosures depend upon ventilation to remove the condensation which accumulates inside the beehive and this constitutes the crux of the problem. In order to be effective as a drying agent, the air must be heated and relative humidity reduced. In winter when the bees are more or less dormant and will not be sufficiently active to heat the air or circulate the air. Instead, the dormant bees will consume the stores and produce additional moisture in the hive.

It has been found with the enclosure 10 and in accordance with the method of the present invention, that water can be condensed outside the beehive and drained to the ground so that the problem is obviated.

The enclosure 10 comprises a ground surface engaging means 14 on which the beehive 12 is seated. The ground engaging means 14 serves to dispose the beehive above the supporting ground surface L and comprises a panel 16, which is spaced from the base of the walls of the enclosure 10 and formed of expanded polyurethane or similar materials, which have excellent properties of thermal insulation and also a vapor barrier. The panel 16 has a flat upper surface 16a on which the wooden bottom board 12a of the beehive 12 rests, so that the beehive is disposed above the ground surface L.

The enclosure 10 further comprises a wall structure 18 composed of cooperating wall panels, which are formed of expanded polyurethane or similar material, possessing the same characteristics or properties with respect to thermal insulation and also with respect to functioning as a vapor barrier. The wall structure 18 includes a front wall 20, an opposing back wall 22 and opposing side walls 24 and 26. The walls 20, 22, 24 and 26 have lower bottom edges 28, which are coplanar and which are adapted to seat on the ground surface L, with the walls being joined together, as will be described, and forming the side wall structure 18 that is of an internal cross-sectional area greater than the cross-sectional size or dimension of the beehive 12 and its ground engaging means 14 so as to create or establish a lateral free zone or space S between the inner surfaces of the walls of the wall structure 18 and the confronting walls of the beehive, with the space S constituting an insulating air space between the beehive 12 and the walls of the wall structure 18.

Figure 1:
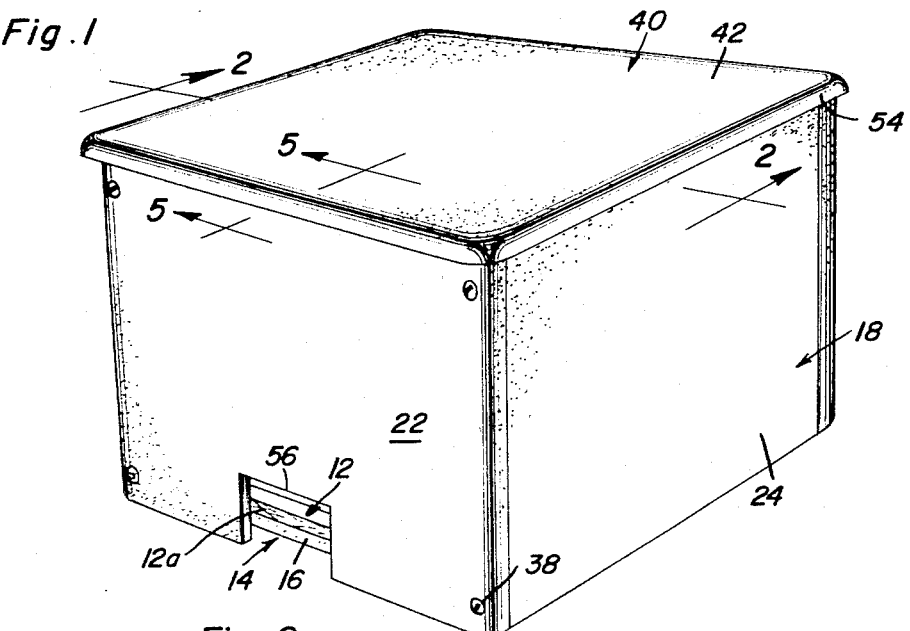
FIGURE 1 is a perspective view of a beehive enclosure constructed in accordance with the present invention.
Figure 3:
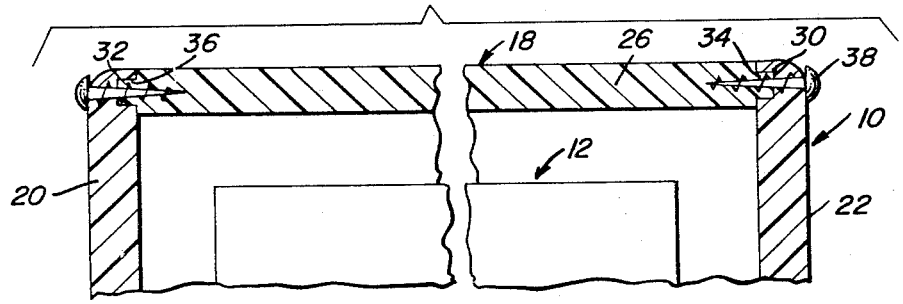
FIGURE 3 is a detailed, horizontal sectional view, taken substantially on line 3—3 of FIGURE 2.
Figure 4:
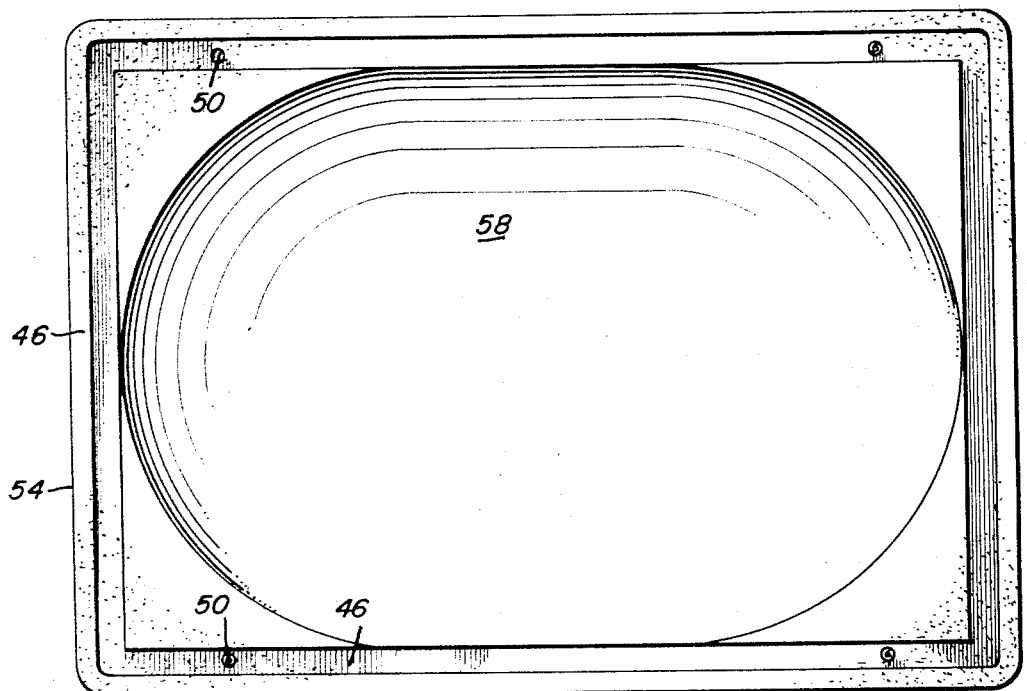
FIGURE 4 is a plan view of the inside of the cover means or lid member for the enclosure.
Figure 5:
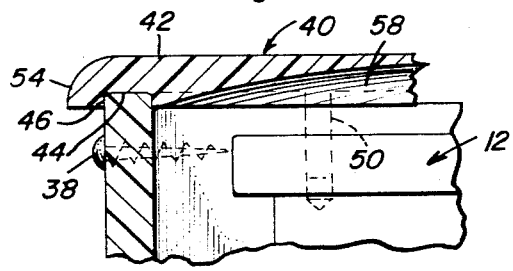
FIGURE 5 is a fragmentary, cross-sectional view taken substantially on line 5—5 of FIGURE 1.

As shown more particularly in FIGURE 3, with respect to the side wall 26, the front and rear walls 20 and 22 are formed, adjacent their opposing sides and on their inner faces with vertical grooves 30 and 32, which are adapted to snugly receive the projecting tongues 34 and 36, which are formed on the opposing side edges of the side wall 26. In this fashion, the side walls 24 and 26 are secured by a tongue and groove arrangement so that the side walls are interlocked with the front and rear walls. Screw type fasteners 38 are provided and extend through the tongue and groove arrangement and are disposed adjacent the corners of the front and rear walls, as shown in FIGURE 1. By virtue of such arrangement, it can be appreciated that the corners are smooth and rounded and have no projections and that a very airtight, secure fit is provided between the adjoining side edges of the side walls and the front and rear walls.

Cover means 40 is provided and is adapted to be removably disposed on the upper coplanar edges 44 of the walls of the wall structure 18. The cover means 40 includes a cover lid member 42, which is formed from polyurethane or similar material and which is provided with a groove 46, the groove being formed adjacent the peripheral edges of the lid and being provided on the underside 48 so as to receive the upper edges 44, as shown in FIGURE 2. In this fashion, the lid fits tightly on the upper edges 44 of the side walls and front and rear walls of the wall structure 18.

Means is provided, in addition to the groove 46, for locating the cover lid 42 on the walls of the wall structure 18 and such means comprises dowels 50, which depend from the groove 46 and are adapted to be seated or socketed in bores 52 formed vertically in the side walls 24 and 26, for example, with the bores extending through the upper edges 44 of such side walls.

It can be seen that the lid has a projecting peripheral portion 54, which overhangs the outer surfaces of the side walls and front and rear walls and which can be manually gripped to raise and lower the lid 42 in positioning the groove 46 on the upper edges 44 of the walls and locating the dowels 50 in position in the bores 52. Thus, an interlocking arrangement is provided for locating the cover lid in position on the walls of the wall structure while still permitting the cover lid to be easily removed during an occasional brief respite of a day or a few hours in low winter temperature when winter sunshine may warm the air enough to allow the bees a short flight. By removing the cover lid the beekeeper allows the sun to shine on the beehive to elevate the temperature thereof so as to attract the bees to a "sanitary flight."

The front wall 20 is formed, at its lower end edge with a cutout portion 56, which permits a circulation of air, without causing a draft, the cutout being directly in front of the hive entrance.

During the wintering of the bees at low temperatures, the presence of the air space S between the hive and insulating wall structure 18 is of utmost importance. In this respect, it is again to be noted that the inside dimensions of the insulator enclosure are greater, for example by one inch, than the exterior outside dimensions of the beehive 12 and its ground engaging means 14.

When the temperature surrounding the enclosure 10 drops, the inside temperature will also drop, but more slowly, and a temperature differential will result. At a particular atmospheric condition, a dewpoint will be reached. However, due to the insulating properties of the device or enclosure 10, the dewpoint will be disposed outside of the beehive 12. Thus, condensation, when it appears, will collect on the inside surfaces of the wall structure 18 and drain therealong to the ground between the ground supporting means 14 for the beehive and the bottom edges 28 of the wall structure.

The major portion of the underside 48 of the cover lid member 42 is concave, as indicated by reference numeral 58, with the concave portion 58 extending between the insides of the walls of the wall structure 18 and being somewhat elliptical in its lengthwise extension between the front and rear walls of the wall structure 18. This facilitates drainage of any condensate collected on the interior of the lid toward the periphery thereof for drainage down the interior of the wall structure 18.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. The method of protectively enclosing a beehive comprising mounting the beehive on an insulated platform on a supporting surface and positioning a side wall and top wall enclosure of thermal insulating properties over the beehive with the enclosure resting on the surface and spaced from the beehive to establish an air space between it and the beehive and spacing the platform from said side wall and top wall enclosure.

2. An enclosure for a beehive, comprising: an insulated platform placed on a supporting surface with the beehive situated on said insulated platform, a side wall structure adapted to be seated on said supporting surface and spaced from the beehive and its insulated platform to establish an air space between the side wall structure and the beehive and platform, and a cover means mounted on the side wall structure and overlying the beehive in spaced relation thereto to establish an air space between the cover means and the beehive.

3. The invention of claim 2, wherein said side wall structure and the cover means are formed from material having thermal insulating and moisture barrier properties.

4. The invention of claim 2, wherein said side wall structure and the cover means are formed from expanded polyurethane.

5. The invention of claim 2, wherein said side wall structure includes wall panels formed from material having inherent thermal insulating properties, said wall panels having adjoining vertical edges and interlocking means securing said edges together.

6. The invention of claim 5, wherein said interlocking means includes a tongue and groove arrangement and removable fasteners inserted through said tongue and groove arrangement.

7. The invention of claim 5, wherein said wall panels have upper coplanar edges and said cover means includes a lid member formed from material having inherent thermal insulating properties and removably seated on said upper edges and interengaging means between said lid member and the upper edges for locating the lid member in place.

8. The invention of claim 7, wherein said interengaging means includes the provision of vertical bores in the wall panels with the bores opening through the upper edges and the lid member having an underside provided with pins seated in the bores.

9. The invention of claim 7, wherein said interengaging means includes the provision of vertical bores in the wall panels with the bores opening through the upper edges and the lid member having an underside provided with pins seated in the bores, and said lid member having a groove on its underside adapted to receive the upper edges with the pins depending from the groove.

References Cited

UNITED STATES PATENTS

| | | | |
|---|---|---|---|
| 620,859 | 3/1899 | Taylor | 6—1 |
| 1,067,459 | 7/1913 | Bosserman | 6—1 |
| 2,358,160 | 9/1944 | Haack | 6—1 |
| 2,885,819 | 5/1959 | Newell et al. | 43—55 |

FOREIGN PATENTS 955,681  7/1949  France.

LUCIE H. LAUDENSLAGER, *Primary Examiner.*

U.S. Cl. X.R.

6—12